(12) United States Patent
Chen et al.

(10) Patent No.: US 10,314,009 B2
(45) Date of Patent: *Jun. 4, 2019

(54) COMMUNICATION METHOD AND DEVICE IN TIME DIVISION DUPLEXING SYSTEM

(71) Applicant: HUAWEI TECHNOLOGIES CO., LTD., Shenzhen (CN)

(72) Inventors: Xiaofeng Chen, Shenzhen (CN); Yongxia Lv, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

This patent is subject to a terminal disclaimer.

(21) Appl. No.: 15/144,931

(22) Filed: May 3, 2016

(65) Prior Publication Data

US 2016/0249326 A1    Aug. 25, 2016

Related U.S. Application Data

(63) Continuation of application No. 14/104,475, filed on Dec. 12, 2013, now Pat. No. 9,363,030, which is a
(Continued)

(30) Foreign Application Priority Data

Jun. 14, 2011  (CN) .......................... 2011 1 0159142

(51) Int. Cl.
*H04W 72/00*    (2009.01)
*H04W 72/04*    (2009.01)
(Continued)

(52) U.S. Cl.
CPC ........ *H04W 72/005* (2013.01); *H04B 7/2615* (2013.01); *H04B 7/2656* (2013.01);
(Continued)

(58) Field of Classification Search
None
See application file for complete search history.

(56) References Cited

U.S. PATENT DOCUMENTS

2010/0220597 A1* 9/2010 Ji .......................... H04W 16/10
370/241
2010/0272004 A1* 10/2010 Maeda .................. H04L 5/0007
370/312
(Continued)

FOREIGN PATENT DOCUMENTS

CN          101500195          8/2009
CN          101505502 A        8/2009
(Continued)

OTHER PUBLICATIONS

Extended European Search Report dated Apr. 2, 2014 in corresponding European Patent Application No. 12800622.8.
(Continued)

*Primary Examiner* — Anh Ngoc M Nguyen
(74) *Attorney, Agent, or Firm* — Staas & Halsey LLP

(57) ABSTRACT

Embodiments of the present invention relate to a communication method and a device in a time division duplexing system. The communication method in a time division duplexing system includes: notifying a user equipment of an uplink-downlink configuration of a radio frame; specifying a part of downlink subframes corresponding to the uplink-downlink configuration of the radio frame as MBSFN subframes; and sending first information to the user equipment, where the first information is used to indicate that multicast areas of the MBSFN subframes are used for uplink communication or downlink communication.

14 Claims, 3 Drawing Sheets

Related U.S. Application Data continuation of application No. PCT/CN2012/076922, filed on Jun. 14, 2012.

(51) Int. Cl.
   *H04B 7/26* (2006.01)
   *H04J 3/16* (2006.01)
   *H04L 5/00* (2006.01)
   *H04L 5/14* (2006.01)
   *H04W 84/04* (2009.01)

(52) U.S. Cl.
   CPC .......... *H04J 3/1694* (2013.01); *H04L 5/0007* (2013.01); *H04L 5/14* (2013.01); *H04W 72/042* (2013.01); *H04W 72/0446* (2013.01); *H04W 84/042* (2013.01)

(56) References Cited

U.S. PATENT DOCUMENTS

| | | | | |
|---|---|---|---|---|
| 2011/0090983 A1* | 4/2011 | Zhang | ................ | H04L 27/2607 375/295 |
| 2011/0103290 A1* | 5/2011 | Suzuki | ................ | H04L 5/0023 370/312 |
| 2011/0164549 A1* | 7/2011 | Huang | ................ | H04L 5/0007 370/312 |
| 2012/0093071 A1* | 4/2012 | Huang | ............... | H04B 7/15542 370/315 |
| 2012/0163305 A1* | 6/2012 | Nimbalker | ........ | H04W 52/0206 370/329 |

FOREIGN PATENT DOCUMENTS

| | | | | |
|---|---|---|---|---|
| CN | 102045140 A | 5/2011 | | |
| EP | 2 328 314 A1 | 6/2011 | | |
| EP | 2400786 A1 * | 12/2011 | ......... | H04L 27/2602 |
| WO | 2010/049587 A1 | 5/2010 | | |
| WO | 2010/110584 A2 | 9/2010 | | |
| WO | WO 2010110584 A2 * | 9/2010 | ............... | H04L 5/00 |
| WO | 2012/161508 A2 | 11/2012 | | |

OTHER PUBLICATIONS

Yang, Hu. "3GPP LTE Rel-11." PowerPoint presentation. Ericsson AB. Dec. 16, 2010. Slides 1-26.

International Search Report dated Sep. 20, 2012 in corresponding International Patent Application No. PCT/CN2012/076922.

Chinese Office Action and Search Report dated Aug. 5, 2015 in corresponding Chinese Patent Application No. 201110159142.9.

Notice of Allowance dated Feb. 4, 2016 in related U.S. Appl. No. 14/104,475.

Final Office Action dated Oct. 26, 2015 in related U.S. Appl. No. 14/104,475.

Office Action dated Apr. 30, 2015 in related U.S. Appl. No. 14/104,475.

U.S Appl. No. 14/104,475, filed Dec. 12, 2013, Xiaofeng Chen et al., Huawei Technologies Co., Ltd.

* cited by examiner

COMMUNICATION METHOD AND DEVICE IN TIME DIVISION DUPLEXING SYSTEM

CROSS-REFERENCE TO RELATED APPLICATIONS

This application is a continuation of U.S. patent application Ser. No. 14/104,475, filed on Dec. 12, 2013, which is a continuation of International Application No. PCT/CN2012/076922, filed on Jun. 14, 2012, The International Application claims priority to Chinese Patent Application No. 201110159142.9, filed on Jun. 14, 2011. The afore-mentioned patent applications are hereby incorporated by reference in their entireties.

TECHNICAL FIELD

Embodiments of the present invention relate to the field of radio communications, and in particular, to a communication method and a device in a time division duplexing system.

BACKGROUND

A Long Term Evolution (Long Term Evolution, LTE for short) system supports a time division duplexing (Time Division Duplexing, TDD for short) mode, that is, an uplink (Uplink, UL for short) and a downlink (Downlink, DL for short) use different timeslots of the same frequency. The uplink is used for uplink communication, that is, if a user equipment needs to send data to a base station, the user equipment may send the data over the uplink; and the downlink is used for downlink communication, that is, if a base station needs to send data to a user equipment, the base station may send the data over the downlink. In an LTE TDD system, uplink-downlink configurations (Uplink-Downlink Configuration) can be configured semi-statically according to service types, so as to meet different requirements for uplink-downlink asymmetric services. However, because which uplink-downlink configuration is used is configured semi-statically and cannot be changed dynamically, a mismatch between a current uplink-downlink configuration and transient uplink and downlink service volumes may occur. Therefore, resources cannot be utilized effectively, especially in cells with a small number of users.

SUMMARY

In one aspect, the present invention provides a method for communication in a time division duplexing system, including: notifying a user equipment of an uplink-downlink configuration of a radio frame; sending configuration information to the user equipment to specify a part of downlink subframes corresponding to the uplink-downlink configuration of the radio frame as MBSFN subframes; and sending first information to the user equipment, where the first information is used to indicate that multicast areas of the MBSFN subframes are used for uplink communication or downlink communication.

In another aspect, the present invention provides a method for communication in a time division duplexing system, including: receiving an uplink-downlink configuration of a radio frame sent by a base station; receiving configuration information that is sent by the base station and specifies a part of downlink subframes corresponding to the uplink-downlink configuration of the radio frame as MBSFN subframes; and receiving first information sent by the base station, where the first information is used to indicate that multicast areas of the MBSFN subframes are used for uplink communication or downlink communication.

In another aspect, the present invention provides a base station for communication in a time division duplexing system, where the base station includes: a configuring module, configured to notify a user equipment of an uplink-downlink configuration of a radio frame and send configuration information to the user equipment to specify a part of downlink subframes corresponding to the uplink-downlink configuration of the radio frame as MBSFN subframes; and a control module, configured to send first information to the user equipment, where the first information is used to indicate that multicast areas of the MBSFN subframes are used for uplink communication or downlink communication.

In another aspect, the present invention provides a user equipment for communication in a time division duplexing system, where the user equipment includes: a configuration receiving module, configured to receive an uplink-downlink configuration of a radio frame sent by a base station and receive configuration information that specifies a part of downlink subframes corresponding to the uplink-downlink configuration of the radio frame as MBSFN subframes; and an indication receiving module, configured to receive first information, where the first information is used to indicate that multicast areas of the MBSFN subframes are used for uplink communication or downlink communication.

According to the embodiments of the present invention, the first information is used to indicate that the multicast areas of the MBSFN subframes are used for uplink communication or downlink communication, so that the uplink-downlink resource ratio matches transient uplink and downlink service volumes and resources are utilized effectively. Meanwhile, backward compatibility is achieved when downlink subframes are configured as MBSFN subframes, ensuring that old release and new release UEs using different hybrid automatic repeat request (Hybrid Automatic Repeat Request, HARQ) time sequences can work normally at the same time in a TDD system.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts. Among the drawings.

DESCRIPTION OF EMBODIMENTS

Figure 1:
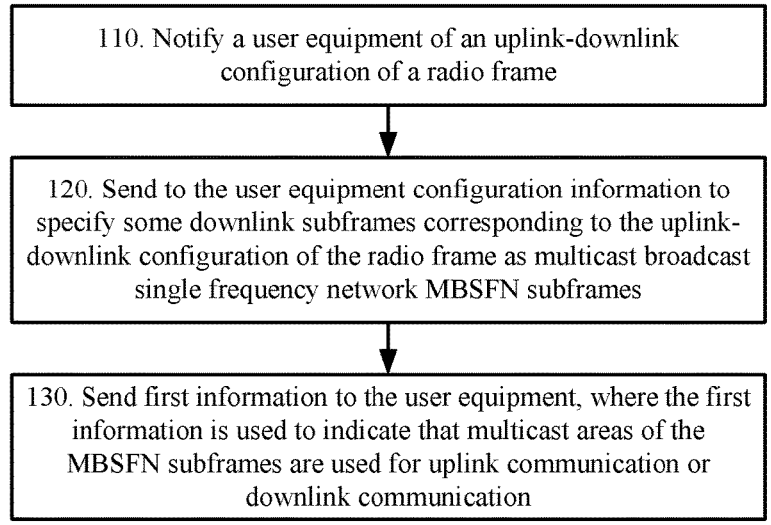
FIG. 1 is a flowchart of a communication method according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Uplink-downlink configuration settings in a Long Term Evolution or Long Term Evolution Advanced Time Division Duplexing (LTE/LTE-A TDD for short) system are firstly introduced. The LTE/LTE-A TDD system includes seven uplink-downlink configurations in total. As shown in Table 1, D represents a downlink subframe, U represents an uplink subframe, and S represents a special subframe that is mostly used for downlink transmission. A downlink subframe consists of multiple orthogonal frequency division multiplexing (Orthogonal Frequency Division Multiplexing, OFDM for short) symbols, and one uplink subframe consists of multiple single carrier frequency division multiple access (Single Carrier Frequency Division Multiple Access, SC-FDMA for short) symbols. As shown in Table 1, time domain resources (D and S) reserved for downlink communication account for 40% to 90% under each uplink-downlink configuration. In the LTE/LTE-A TDD system, which uplink-downlink configuration is used is configured semi-statically.

TABLE 1

| Uplink-downlink subframe configuration | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

To check whether a base station or repeater has received data sent by a user equipment (User Equipment, UE for short) successfully, the UE sends physical uplink shared channel (Physical Uplink Shared Channel, PUSCH for short) data in an uplink subframe with sequence number n and receives an acknowledgement/negative-acknowledgement (Acknowledgement/Negative-acknowledgement, ACK/NACK) message, that is, HARQ-ACK feedback for PUSCH transmission, on a physical HARQ indication channel (Physical HARQ Indication Channel, PHICH) in a subframe with sequence number n+k. For correspondence between each uplink-downlink configuration and a PHICH position, refer to Table 2.

TABLE 2

| Uplink-downlink configuration | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A number in Table 2 indicates a time interval for obtaining a PHICH position, that is, a value of k. For example, for a frame structure with configuration sequence number 0, the value of k is 4 for a subframe with the sequence number n equal to 2 (this subframe is an uplink subframe as inferred from Table 1). This means that subframe n+k, that is, subframe 2+4 (subframe 6 is a downlink subframe as inferred from Table 1), is used to transmit a PHICH corresponding to subframe 2. The same principle applies to the other configurations.

To check whether a UE has received data sent by a base station or repeater successfully, the UE receives physical downlink shared channel (Physical Downlink Shared Channel, PDSCH) data in downlink subframe n and send corresponding uplink HARQ-ACK feedback, that is, UL ACK/NACK, in uplink subframe n+k. Before receiving PDSCH data in downlink subframe n, the UE needs to receive downlink scheduling (DL grant) information sent by the base station or repeater in downlink subframe n. For an uplink ACK/NACK position relationship of each uplink-downlink configuration, refer to Table 3.

TABLE 3

| Uplink-downlink subframe configuration | Subframe No. | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

A number in Table 3 indicates a time interval for obtaining an ACK/NACK position, that is, a value of k. For example, for a frame structure of configuration sequence number 0, the value of k is 4 for subframe with the sequence number n equal to 0 (this subframe is a downlink subframe as inferred from Table 1). This means that subframe n+k, that is, subframe 0+4 (subframe 4 is an uplink subframe as inferred from Table 1) is used to transmit an ACK/NACK corresponding to a PDSCH of subframe 0. The same principle applies to the other configurations.

In each uplink-downlink configuration, resources are allocated and reserved for uplink communication and downlink communication. However, whether there are really uplink data transmission and downlink data transmission still depend on a respective scheduling mechanism. For downlink communication, if a base station needs to send data to a user equipment in downlink subframe n, the base station sends downlink scheduling information, a DL grant, which is used to schedule PDSCH transmission in downlink subframe n, and sends a corresponding PDSCH in downlink subframe n. The UE receives the corresponding PDSCH after receiving the DL grant.

For uplink communication, if a user equipment needs to send data to a base station, the base station needs to send uplink scheduling information, a UL grant, in downlink subframe n and the UE receives the uplink scheduling (UL grant) information in downlink subframe n. Then, the UE sends a PUSCH in subframe n+k. For an uplink scheduling position relationship of each uplink-downlink configuration, refer to Table 4.

TABLE 4

| Uplink-downlink subframe configuration | Uplink-downlink configuration/ Scheduling position | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 1:3 | D | S | U | U | U | D | S | U | U | U |
| | Scheduling position | G0-4 G0-7 | G1-6 G1-7 | | | | G5-4 G5-7 | G6-6 G6-7 | | | |
| 1 | 2:2 | D | S | U | U | D | D | S | U | U | D |
| | Scheduling position | | G1-6 | | | G4-4 | | G6-6 | | | G9-4 |
| 2 | 3:1 | D | S | U | D | D | D | S | U | D | D |
| | Scheduling position | | | | G3-4 | | | | | G8-4 | |
| 3 | 6:3 | D | S | U | U | U | D | D | D | D | D |
| | Scheduling position | G0-4 | | | | | | | | G8-4 | G9-4 |
| 4 | 7:2 | D | S | U | U | D | D | D | D | D | D |
| | Scheduling position | | | | | | | | | G8-4 | G9-4 |
| 5 | 8:1 | D | S | U | D | D | D | D | D | D | D |
| | Scheduling position | | | | | | | | | G8-4 | |
| 6 | 3:5 | D | S | U | U | U | D | S | U | U | D |
| | Scheduling position | G0-7 | G1-7 | | | | G5-7 | G6-7 | | | G9-5 |

In Table 4, Gn-k indicates that scheduling position information is received in subframe n and a PUSCH is sent in subframe n+k. For example, for a frame structure of configuration sequence number 0, G0-4, a number in a subframe with the sequence number n equal to 0 (this subframe is a downlink subframe as inferred from Table 4) indicates that subframe n+k, that is, subframe 0+4 (subframe 4 is an uplink subframe as inferred from Table 4) is used to transmit a PUSCH, thereby implementing scheduling of a UE by a base station. The same principle applied to the other configurations.

The aforesaid time sequence relationships between a PUSCH and a PHICH, a PUSCH and a UL grant, a PDSCH and a UL ACK/NACK, and a PDSCH and a DL grant are called HARQ time sequence relationships hereinafter. For ease of description, network-side nodes such as base stations and repeaters are all referred to hereinafter as base stations.

In the LTE/LTE-A TDD system, because which uplink-downlink configuration is used is configured semi-statically and cannot be changed dynamically, a mismatch between a current uplink-downlink configuration and transient uplink and downlink service volumes may occur. Therefore, resources cannot be utilized effectively, especially in cells with a small number of users. To solve this problem, a concept of dynamic/flexible subframe is introduced. That is, some subframes are configured as dynamic/flexible subframes, which can be switched for uplink communication or downlink communication as required. However, there is no dynamic/flexible subframe function in the prior art and therefore UEs compliant with the prior art release do not know the dynamic/flexible subframe function. Therefore, use of the technology of "configuring some subframes as dynamic/flexible subframes" cannot affect UEs compliant with the prior art release. For example, if all time in time periods corresponding to some downlink subframes are flexibly switched for uplink communication without any reconsideration, any downlink control information that is supposed to be transmitted in these subframes, including possible PHICH feedback, UL grants, and DL grants, cannot be transmitted. As a result, there is no PHICH feedback corresponding to PUSCHs transmitted in some uplink subframes or no UL grants to schedule PUSCHs transmitted in some uplink subframes. For example, for LTE/LTE-A uplink-downlink configuration 2, according to an HARQ-ACK time sequence relationship in the prior art, a PUSCH sent in uplink subframe 7 requires that a corresponding UL grant be received in subframe 3 first. When subframe 3 is switched for uplink communication, it is impossible to send a UL grant in subframe 3 and therefore it is impossible to send a PUSCH in uplink subframe 7 Similarly, a PUSCH sent in uplink subframe 7 requires that PHICH feedback be sent in subframe 3 of a next radio frame. If the subframe 3 of the next radio frame is switched for uplink communication, no PHICH feedback can be sent.

In the embodiments, a part of downlink subframes of a radio frame are specified as multicast broadcast single frequency network (Multicast Broadcast Single Frequency Network, MBSFN for short) subframes, and then multicast areas of these MBSFN subframes are dynamically switched to be uplink communication resources or downlink communication resources by using first information. In this way, the dynamic/flexible subframe function is implemented without affecting user equipments compliant with the prior art release, that is, backward compatibility is ensured. For a method for specifically specifying a part of downlink subframes of a radio frame as multicast broadcast single frequency network (Multicast Broadcast Single Frequency Network, MBSFN for short) subframes, reference may made to a method defined in section 6.3.7 of TS 36.331 V10.1.0 in a 3GPP (3rd Generation Partnership Project, the 3rd Generation Partnership Project) LTE-A Release 10 (Long Term Evolution Advanced Release 10, Long Term Evolution Advanced Release 10) protocol or relevant sections in 3GPP LTE Release 8/9 (the 3rd Generation Partnership Project Long Term Evolution Advanced Release 8/9), which is not specifically limited herein.

An embodiment of the present invention provides a communication method in a TDD system, as shown in FIG. 1. FIG. 1 is a flowchart of a communication method according to Embodiment 1 of the present invention. In step 110, a user equipment is notified of an uplink-downlink configuration of a radio frame.

In the embodiment of the present invention, for example, a network side of a TDD system notifies a UE of uplink-downlink configuration 2. According to the preceding content, in uplink-downlink configuration 2, specifically, subframes 0, 1, 5, and 6 are downlink subframes, subframe 2 is an uplink subframe, and subframes 3, 4, 8, and 9 are downlink subframes. Then, in step 120, configuration information is sent to the user equipment to specify a part of downlink subframes corresponding to the uplink-downlink configuration of the radio frame as multicast broadcast single frequency network MBSFN subframes. In the embodiment of the present invention, all or at least one of subframes 3, 4, 8, and 9 can be configured as an MBSFN subframe. In all uplink-downlink configurations of a TDD system, subframes 0, 1, 5, and 6 are all downlink subframes and important system messages are all designed to be sent in these downlink subframes. Therefore, these subframes cannot be used as dynamic/flexible subframes, and may be called constant downlink subframes. Subframe 2 is always an uplink subframe and may be called a constant uplink subframe. In this case, generally only subframe 3, 4, 7, 8, and 9 may be used as dynamic/flexible subframes. In uplink-downlink configuration 2, subframes 3, 4, 8, and 9 are all downlink subframes and can all be configured as MBSFN subframes to function as dynamic/flexible subframes. In this case, with flexible uplink and downlink switching, a maximum flexibility is provided. Then, in step 130, first information is sent to the user equipment. The first information is used to indicate that multicast areas of the MBSFN subframes are used for uplink communication or downlink communication.

In the prior art of LTE/LTE-A, the downlink subframes except subframes 0, 1, 5, and 6 can be configured as MBSFN subframes. MBSFN subframes are divided into two parts: a control part (also called a unicast area) and a data part (also called a multicast area). The unicast area is designed for unicast communication, that is, separate communication between a base station and each UE, which is used for a base station to send to a UE control information including a DL grant, a UL grant, and a PHICH. The multicast area is designed for broadcast and multicast communication, that is, a base station sends the same data to all or a group of UEs, for example, broadcast and TV programs, where all UEs receive the same program (data). Due to various reasons, however, an ultimate technology is defined as: when notified that a downlink subframe is an MBSFN subframe, UEs of LTE release Release 8/9 or LTE-A release Release 10 receive only content in the unicast area and do not receive any content in the multicast area in remaining time of the MBSFN subframe. In this case, for UEs compliant with the prior art release, the required UL grant, PHICH, and the like can all be obtained from the unicast area of the MBSFN subframe, which addresses the compatibility issue. In addition, for UEs compliant with the prior art release, no extra design is required so long as they know the fact that some subframes are specified as MBSFN subframes. Therefore, the following content designs how to make UEs that need to support the dynamic/flexible subframe function work. Such UEs are hereinafter called new release UEs.

In an embodiment of the present invention, a base station sends first information that is used to indicate that multicast areas of MBSFN subframes are used for uplink communication or downlink communication. A user equipment communicates with the base station according to the uplink-downlink configuration of the radio frame, the configuration information of MBSFN subframes, and the first information. A form of the first information may be as follows:

Whether the multicast area of an MBSFN subframe is used for uplink communication is determined according to whether a UL grant for possible PUSCH transmission corresponding to the MBSFN subframe is received in advance. That is, according to the HARQ time sequence of the prior art, no PUSCH transmission is possible in a downlink subframe, and therefore, no UL grant may be possibly sent in a subframe to schedule a downlink subframe to transmit a PUSCH (see Table 4). To support flexible use of the multicast area of an MBSFN subframe in the uplink or downlink, a UL grant time sequence relationship may also be configured for downlink subframes in advance. When these downlink subframes are specified as MBSFN subframes to implement the dynamic/flexible subframe function, so long as a UE receives a UL grant corresponding to a current MBSFN subframe. Then the UE is aware that the multicast area of the current MBSFN subframe is used for uplink communication. If the UE does not receive the corresponding UL grant, the multicast area of the corresponding MBSFN subframe is used for downlink communication. In this way, the UE not only knows whether the multicast area of an MBSFN subframe is used for uplink communication or downlink communication but also obtains the UL grant corresponding to uplink PUSCH transmission when the multicast area of the MBSFN subframe is used for the uplink communication.

Alternatively, a separate signaling is newly designed to only indicate whether the multicast area of an MBSFN subframe is used for uplink communication or downlink communication, and the signaling does not need to be bound with a corresponding UL grant when the multicast area of an MBSFN subframe is used for uplink communication. When receiving the separate signaling, the UE knows whether the multicast area of the corresponding MBSFN subframe is used for uplink communication or downlink communication. When the multicast area of the corresponding MBSFN subframe is used for downlink communication, the UE detects the unicast area of the corresponding MBSFN subframe for a DL grant. If a DL grant is detected, the UE receives PDSCH data from the multicast area. When the multicast area of the corresponding MBSFN subframe is used for uplink communication, the UE also needs to search for a corresponding UL grant, and, if a UL grant is detected, the UE sends PUSCH data in the multicast area of the MBSFN subframe.

The preceding is only a possible form of the first information, and there may be other forms, which are not limited in the present invention.

In the embodiment of the present invention, regardless whether the first information has been received, a new release UE needs to receive and monitor (monitor) the unicast area of an MBSFN subframe, where a DL grant, a PHICH, a UL grant, and the like may be received. In a case that no first information is received or no DL grant is detected in the unicast area, the UE cannot receive or use any data in the multicast area. If the UE detects a DL grant in the unicast area, the UE receives a corresponding PDSCH in the multicast area according to indication of the DL grant.

Figure 2:
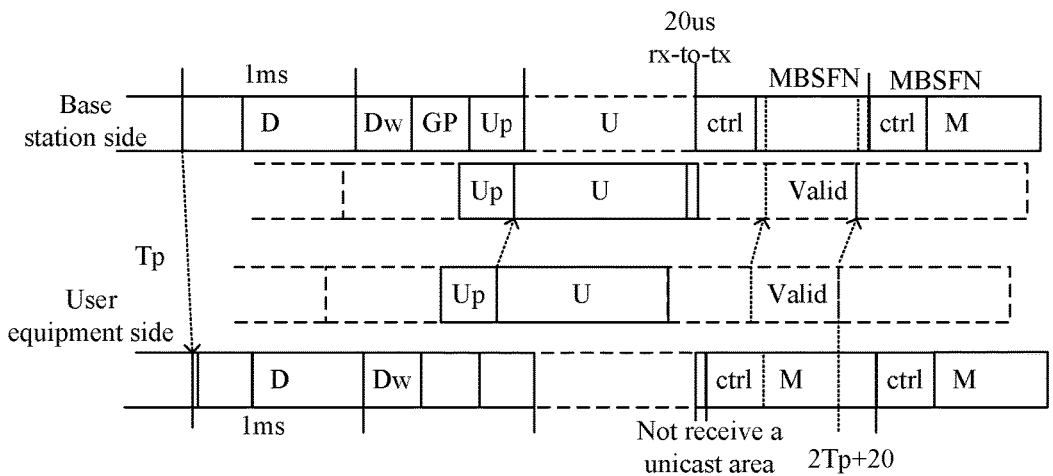
FIG. 2 is a schematic diagram of a truncated uplink subframe according to an embodiment of the present invention.

In a case that the UE receives the first information and receives a UL grant corresponding to an MBSFN subframe, after receiving the unicast area of the MBSFN subframe, the UE needs to send uplink information in the multicast area of the MBSFN subframe. In this case, the uplink information transmitted is a truncated subframe compared with a normal subframe. A reason is briefed as follows:

In FIG. 2, "M", "ctrl", "Up", and "Dw" represent a multicast area, a unicast area, an uplink, and a downlink respectively. For a base station side, the base station needs to first send out the unicast area of an MBSFN subframe and then receive data in the remaining time. It can be seen that the remaining time is not as long as a subframe, for example, 1 ms. In addition, it may take some time for the base station to switch from a sending state to a receiving state. Furthermore, according to uplink-downlink configurations, a downlink subframe (including an MBSFN subframe) is always followed by another downlink subframe (including a normal downlink subframe and a downlink part of an MBSFN subframe or a special subframe). Therefore, the base station must switch back to the sending state after the receiving is completed, which also takes some switching time. The switching time, certainly, is determined by aspects such as the implementation technical level and performance. It is possible that the time for switching between a sending state and a receiving state is 0, that is, there is no switching time. Therefore, from the aspect of the base station side, receiving time available for the base station, that is, sending time of a UE, is shorter than a normal uplink subframe. From the aspect of the UE side, the UE needs to first receive the multicast area of the MBSFN subframe and then switch to the sending state. Therefore, sending time available for the UE is also shorter than a normal uplink subframe. As also shown in FIG. 2, the UE can send only the last several symbols of a normal uplink subframe.

According to Embodiment 1, the multicast area of an MBSFN subframe is used to send uplink information to a base station, and therefore UL grants that schedule these uplink PUSCHs can generally be sent in any downlink subframe. Because a UL grant is transmitted in a unicast area and, in the case of Embodiment 1, a unicast area is transmitted in any downlink subframe (including downlink frames that are specified as MBSFN subframes), the UL grant can be sent in any downlink subframe. Firstly, a UL grant may be transmitted in the unicast area of a constant downlink subframe. In addition, from the HARQ time sequence relationship in Table 2/3/4, it can be seen that, as stipulated in a 3GPP LTE Release 8 or Release 9 or LTE-A Release 10 protocol (specifically, stipulations related to HARQ time sequence relationships in the protocol), some downlink subframes may be specified as MBSFN subframes and the unicast areas of these subframes are used to transmit only DL grants rather than PHICHs and UL grants. Such downlink subframes are called class 1 subframes. For example, subframes 4 and 9 in uplink-downlink configuration 2 are class 1 subframes. When class 1 subframes are specified as MBSFN subframes and the multicast areas of these subframes are used for uplink communication, no PDSCH is transmitted and therefore no DL grant needs to be transmitted either. In this case, unicast areas of these MBSFN subframes are unoccupied and therefore UL grants corresponding to PUSCH transmission in all MBSFN subframes (including MBSFN subframes indicated by class 1 subframes) can be transmitted in the unicast areas of these class 1 subframes. Specifically, that the uplink-downlink configuration notified is uplink-downlink configuration 2 and that subframes 3, 4, 8, and 9 are configured as MBSFN subframes is taken as an example. When the multicast areas of the MBSFN subframes are indicated to be used for uplink communication and the unicast areas of the MBSFN subframes are used for downlink communication, the multicast areas of subframes 8 and 9 may be used to carry physical uplink shared channel PUSCH information and subframe 4 is used to carry UL grants corresponding to possible PUSCH transmission in subframes 8 and 9, or the multicast areas of subframes 3 and 4 are used to carry PUSCH information and subframe 9 is used to carry UL grants corresponding to possible PUSCH transmission in subframes 3 and 4. In this case, when a UL grant is received in subframe 4, the UE will send a truncated PUSCH in the multicast area of subframe 8 or 9. When a UL grant is received in subframe 9, the UE will send a truncated PUSCH in the multicast area(s) of subframe 3 and/or subframe 4 of a next radio frame.

Figure 3:
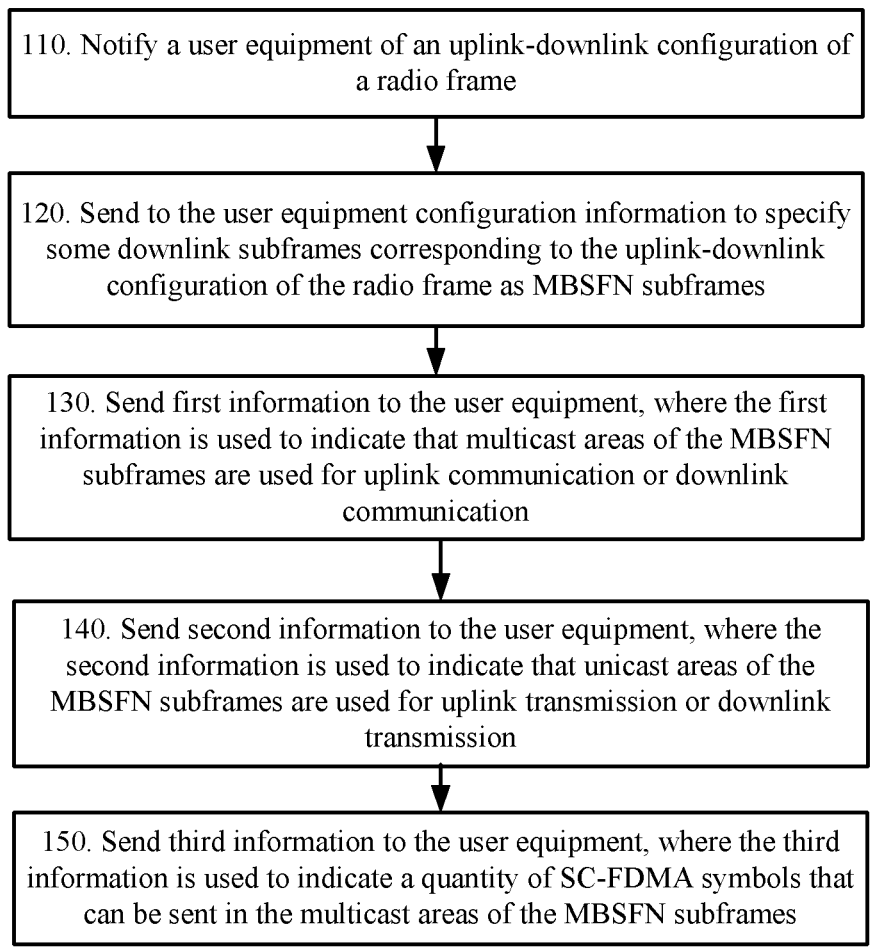
FIG. 3 is a flowchart of a communication method according to an embodiment of the present invention.

FIG. 3 shows a flowchart of Embodiment 2 of the present invention. As shown in FIG. 3, steps 110 to 130 in Embodiment 2 are the same as steps 110 to 130 in Embodiment 1 shown in FIG. 1 and therefore are not repeated herein. Embodiment 2 is different from Embodiment 1 in that: when the multicast area of an MBSFN subframe is switched for uplink communication, optionally, the unicast area of the MBSFN subframe may be switched for uplink communication or downlink transmission according to specific network conditions of a TDD system, for example, whether there is a UE compliant with the prior art release. The switching is completed by using second information. Specifically, as shown in FIG. 3, if there is a UE compliant with a HARQ time sequence in the prior art release in the TDD system, when the MBSFN subframes are switched to be uplink subframes, that is, the multicast areas of the MBSFN subframes are used for uplink communication, the network side sends second information to the UE in step 140. The second information indicates that the unicast areas of the MBSFN subframes are used for downlink communication. If there is no UE compliant with a HARQ time sequence in the prior art release in the TDD system, when the MBSFN subframes are switched to be uplink subframes, that is, the multicast areas of the MBSFN subframes are used for uplink communication, the network side sends second information to the UE in step 140. The second information indicates that the unicast areas of the MBSFN subframes are used for uplink communication, that is, both multicast and unicast areas of the MBSFN subframes are used for uplink communication. When the second information indicates that the unicast areas of the MBSFN subframes are used for downlink transmission, the process is the same as that in Embodiment 1. For example, a UL grant, a PHICH, and a DL grant may all be transmitted in the unicast area of an MBSFN subframe. After receiving the unicast area of an MBSFN subframe, the UE needs to send uplink information in the multicast area of the MBSFN subframe. The uplink information sent at this time is a truncated subframe compared with a normal subframe. The reason has been described above. Therefore, as shown in FIG. 3, in step 150, the base station may send third information to the UE, to indicate a quantity of SC-FDMA symbols that can be sent when the multicast areas of the MBSFN subframes are indicated to be used for uplink communication.

According to Embodiment 2 of the present invention, when a UE receives first information and second information indicating that both the multicast area and the unicast area of an MBSFN subframe are used for uplink communication, a new release UE definitely receives no unicast area. To ensure uniform design, when a UE receives first information and second information indicating that the multicast area and the unicast area of an MBSFN subframe are used for uplink communication and downlink transmission respectively, it may be considered to make a new release UE not receive or monitor the unicast area of the MBSFN subframe. If a UE receives a UL grant used to instruct to transmit uplink subframe data in the MBSFN subframe, the UE may send a truncated uplink subframe in the multicast area of the MBSFN subframe. In this case, because a new release UE does not receive or monitor the unicast area of an MBSFN subframe, a UL grant that schedules a PUSCH transmitted in the MBSFN subframe should be set in a constant downlink subframe. For example, in all TDD uplink-downlink configurations, subframes 0, 1, 5, and 6 are all downlink subframes and important system messages are all designed to be sent in these downlink subframes. Therefore, these subframes cannot be used as dynamic/flexible subframes to be switched for uplink communication. Therefore, the UL grant can be set in any subframe among subframes 0, 1, 5, and 6.

According to an embodiment of the present invention, the base station may send the first information and the second information to the UE simultaneously to notify the UE that the multicast area and the unicast area of an MBSFN subframe are used for uplink communication or downlink transmission. In addition, the second information may be sent separately. For example, the UE may be notified by using high layer signaling. If the multicast area of an MBSFN subframe is switched for uplink communication, when there is a UE compliant with the prior art release on a network, it is indicated that the unicast area of the MBSFN subframe is used for downlink transmission, or when there is no UE compliant with the prior art release on a network, it is indicated that the unicast area of the MBSFN subframe is used for uplink communication. Such configuration persists until the UE receives new second information. When the unicast area of an MBSFN subframe is used for uplink communication, the base station does not send downlink information in the MBSFN subframe. Therefore, a UL grant corresponding to an uplink PUSCH in the MBSFN subframe is set in a constant downlink subframe, for example, subframe 0, 1, 5, or 6.

Figure 4:
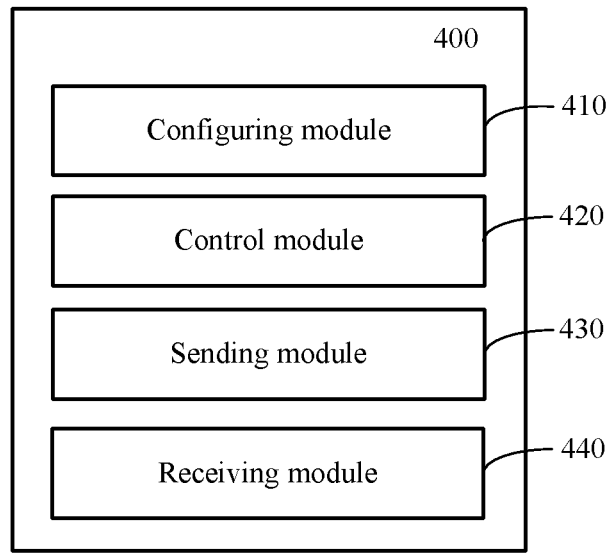
FIG. 4 is a schematic structural diagram of a base station according to an embodiment of the present invention.

FIG. 4 is a structural block diagram of a base station 400 according to an embodiment of the present invention. The base station 400 is used to implement a communication method according to the embodiments of the present invention. As shown in FIG. 4, the base station 400 includes: a configuring module 410, configured to notify a UE of the uplink-downlink configuration of a radio frame and send to the UE configuration information for configuring a part of downlink subframes in the uplink-downlink configuration of the radio frame as MBSFN subframes; and a control module 420, configured to send first information to the UE, where the first information is used to indicate that a multicast area of an MBSFN subframe is used for uplink communication or downlink transmission. According to an embodiment of the present invention, the base station 400 also includes a sending module 430, configured to send downlink subframes; and a receiving module 440, configured to receive uplink subframes. According to an embodiment of the present invention, for example, the configuring module 410 of the base station 400 configures the uplink-downlink configuration of the radio frame to the aforesaid configuration 2, configures part or all of subframes 3, 4, 8, and 9 therein as MBSFN subframes, and then notifies the UE of the uplink-downlink configuration and the MBSFN subframe configuration. According to a requirement of uplink and downlink service volumes, the control module 420 of the base station 400 sends first information to the UE to indicate that a multicast area of an MBSFN subframe is used for uplink communication or downlink transmission. When the multicast area of an MBSFN subframe is used for uplink communication, according to whether there is a UE compliant with the prior art release in a TDD system, the control module 420 of the base station 400 sends second information to the UE to indicate that a unicast area of the MBSFN subframe is used for uplink communication or downlink communication. Specifically, when the multicast area of the MBSFN subframe is used for uplink communication, for example, if there is a UE compliant with the prior art release in the TDD system, the control module 420 of the base station 400 sends second information to the UE to indicate that a unicast area of the MBSFN subframe is used for downlink transmission; and if there is no UE compliant with the prior art release in the TDD system, the control module 420 of the base station 400 sends second information to the UE to indicate that a unicast area of the MBSFN subframe is also used for uplink communication.

When the multicast area of an MBSFN subframe is used for unlink communication and the unicast area of the MBSFN subframe is used for downlink transmission, the control module 420 of the base station 400 sends third information to the UE to indicate a quantity of SC-FDMA symbols that can be sent in the multicast area of the MBSFN subframe.

The following describes a process where the base station 400 implements a HARQ time sequence by flexibly switching MBSFN subframes with reference to a specific implementation process. For example, the sending module 430 sends a UL grant and/or downlink HARQ-ACK feedback information in a downlink subframe that is not specified as an MBSFN subframe, for example, subframe 0, 1, 5, or 6. The UL grant is used to schedule an PUSCH for uplink communication received by the receiving module 440 in a multicast area of an MBSFN subframe. The downlink HARQ-ACK feedback information is used to perform HARQ-ACK feedback to the PUSCH for uplink communication received by the receiving module 440 in the multicast area of the MBSFN subframe. The receiving module 440 is configured to receive the PUSCH for uplink communication in the multicast area of the MBSFN subframe. For example, the sending module 430 sends a UL grant in a class 1 subframe. The UL grant is used to schedule an PUSCH for uplink communication received by the receiving module 440 in a multicast area of an MBSFN subframe. The class 1 subframe is a downlink subframe that is specified as an MBSFN subframe and, as stipulated in a 3GPP LTE Release 8 or Release 9 or LTE-A Release 10 HARQ protocol, does not need to send a UL grant, as shown in Table 1 to Table 4. The receiving module 440 is configured to receive the PUSCH for uplink communication in a multicast area of the MBSFN subframe.

Figure 5:
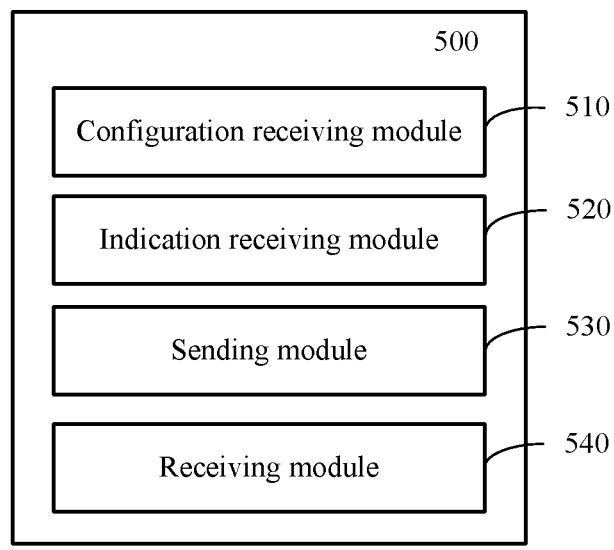
FIG. 5 is a schematic structural diagram of a user equipment according to an embodiment of the present invention.

FIG. 5 is a structural block diagram of a user equipment 500 according to an embodiment of the present invention. The user equipment 500 is used to implement a communication method according to the embodiments of the present invention. As shown in FIG. 5, the user equipment 500 includes: a configuration receiving module 510, configured to receive an uplink-downlink configuration of a radio frame sent by a base station and receive configuration information where a part of downlink subframes corresponding to the uplink-downlink configuration of the radio frame are specified as MBSFN subframes; and an indication receiving module 520, configured to receive first information sent by the base station, where the first information is used to indicate that multicast areas of the MBSFN subframes are used for uplink communication or downlink communication. According to an embodiment of the present invention, the user equipment 500 may also include a sending module

430, configured to send uplink subframes; and a receiving module 440, configured to receive downlink subframes.

According to an embodiment of the present invention, for example, the uplink-downlink configuration of the radio frame received by the configuration receiving module 510 of the user equipment 500 is the aforesaid configuration 2, where part or all of subframes 3, 4, 8, and 9 are configured as MBSFN subframes. According to a requirement of uplink and downlink service volumes, the indication receiving module 520 of the user equipment 500 receives first information that indicates that a multicast area of an MBSFN subframe is used for uplink communication or downlink transmission. When the multicast area of an MBSFN subframe is used for uplink communication, according to whether there is a UE compliant with the prior art release in a TDD system, the indication receiving module 520 of the user equipment 500 receives second information from the base station. The second information is used to, when the multicast area of the MBSFN subframe is indicated to be used for uplink communication, indicate that a unicast area of the MBSFN subframe is used for uplink communication or downlink communication.

When the multicast area of the MBSFN subframe is used for uplink communication, the indication receiving module 520 of the user equipment 500 receives third information from the base station. The third information is used to, when the multicast area of the MBSFN subframe is indicated to be used for uplink communication, indicate a quantity of SC-FDMA symbols that can be sent in the multicast area of the MBSFN subframe.

The following describes a process where the user equipment 500 implements a HARQ time sequence by flexibly switching MBSFN subframes with reference to a specific implementation process. For example, the receiving module 540 receives a UL grant and/or downlink HARQ-ACK feedback information in a constant downlink subframe, that is, a subframe that is not specified as an MBSFN subframe, for example, in subframe 0, 1, 5, or 6. The UL grant is used to schedule an PUSCH for uplink communication sent by the sending module 430 in a multicast area of an MBSFN subframe. The downlink HARQ-ACK feedback information is used to perform HARQ-ACK feedback to the PUSCH for uplink communication sent by the sending module 430 in the multicast area of the MBSFN subframe. The sending module 430 is configured to send the PUSCH for uplink communication in the multicast area of the MBSFN subframe. For example, the receiving module 440 receives a UL grant in a class 1 subframe, where the UL grant is used to schedule an PUSCH for uplink communication sent by the sending module 430 in a multicast area of an MBSFN subframe. The class 1 subframe is a downlink subframe that is specified as an MBSFN subframe and, according to a 3GPP LTE Release 8 or Release 9 or 3GPP LTE-A Release 10 HARQ protocol, does not need to send a UL grant. The sending module 430 is configured to send the PUSCH for uplink communication in the multicast area of the MBSFN subframe.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of a method or algorithm described in the embodiments disclosed herein may be implemented by hardware, a software module executed by a processor or a combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or a storage medium of any other form commonly known in the art.

Although some embodiments of the present invention have been illustrated and described, those skilled in the art should understand that various modifications can be made to these embodiments without departing from the principle of the present invention and all such modifications shall fall in the scope of the present invention.

What is claimed is:

1. A non-transitory computer readable medium storing instructions codes for a base station communication in a time division duplexing system, which when executed by the base station, cause the base station to perform:
   notifying a user equipment of an uplink-downlink configuration of a radio frame;
   sending configuration information to the user equipment to specify a part of downlink subframes corresponding to the uplink-downlink configuration of the radio frame as multicast broadcast single frequency network MBSFN subframes; and
   sending first information to the user equipment, wherein the first information is used to indicate that multicast areas of the MBSFN subframes are used for uplink communication or downlink communication.

2. A non-transitory computer readable medium storing instructions codes for a base station communication in a time division duplexing system, which when executed by the base station, cause the base station to perform:
   notifying a user equipment of an uplink-downlink configuration of a radio frame;
   sending configuration information to the user equipment to specify a part of downlink subframes corresponding to the uplink-downlink configuration of the radio frame as multicast broadcast single frequency network MBSFN subframes; and
   sending first information to the user equipment, wherein the first information is used to indicate that multicast areas of the MBSFN subframes are used for uplink communication or downlink communication,
   wherein the notifying the user equipment of the uplink-downlink configuration of the radio frame and the sending configuration information to the user equipment to specify a part of downlink subframes corresponding to uplink-downlink configuration of the radio frame as MBSFN subframes, specifically comprise:
   notifying the user equipment in a Long Term Evolution or Long Term Evolution Advanced Time Division Duplexing LTE/LTE-A TDD system of uplink-downlink configuration 2 of the radio frame; and specifying at least one subframe of subframes 3, 4, 8, and 9 in uplink-downlink configuration 2 as an MBSFN subframe.

3. The non-transitory computer readable medium according to claim 2, wherein:

when the multicast areas of the MBSFN subframes are indicated to be used for uplink communication and unicast areas of the MBSFN subframes are used for downlink communication, multicast areas of subframes 8 and 9 are used to carry physical uplink shared channel PUSCH information and a unicast area of subframe 4 is used to carry uplink scheduling information, a UL grant corresponding to the PUSCH information; or multicast areas of subframes 3 and 4 are used to carry PUSCH information and a unicast area of subframe 9 is used to carry a UL grant corresponding to the PUSCH information.

4. The non-transitory computer readable medium according to claim 1, further comprising:
when the multicast areas of the MBSFN subframes are indicated to be used for uplink communication, sending uplink scheduling information, a UL grant, and/or downlink hybrid automatic repeat request acknowledgement HARQ-ACK feedback information in a downlink subframe that is not specified as an MBSFN subframe, wherein the UL grant is used to schedule an PUSCH for uplink communication in the multicast areas of the MBSFN subframes and the downlink HARQ-ACK feedback information is used to perform HARQ-ACK feedback to the PUSCH for uplink communication in the multicast areas of the MBSFN subframes.

5. The non-transitory computer readable medium according to claim 1, further comprising:
when the multicast areas of the MBSFN subframes are indicated to be used for uplink communication, sending uplink scheduling information, a UL grant, in a class 1 subframe, wherein the UL grant is used to schedule an PUSCH for uplink communication in the multicast areas of the MBSFN subframes and the class 1 subframe belongs to the MBSFN subframes and is a downlink subframe that, according to a 3rd Generation Partnership Project Long Term Evolution 3GPP LTE Release 8 protocol, does not need to send a UL grant.

6. The non-transitory computer readable medium according to claim 1, further comprising:
sending second information to the user equipment, wherein the second information is used to, when the multicast areas of the MBSFN subframes are indicated to be used for uplink communication, indicate that the unicast areas of the MBSFN subframes are used for uplink communication or downlink communication.

7. The non-transitory computer readable medium according to claim 1, further comprising:
sending third information to the user equipment, wherein the third information is used to, when the multicast areas of the MBSFN subframes are indicated to be used for uplink communication, indicate a quantity of single carrier frequency division multiple access SC-FDMA symbols that can be carried in the multicast areas of the MBSFN subframes.

8. A non-transitory computer readable medium storing instructions codes for user equipment communication in a time division duplexing system, which when executed by the user equipment, cause the user equipment to perform:
receiving an uplink-downlink configuration of a radio frame sent by a base station;
receiving configuration information that is sent by the base station and specifies a part of downlink subframes corresponding to the uplink-downlink configuration of the radio frame as MBSFN subframes; and
receiving first information sent by the base station, wherein the first information is used to indicate that multicast areas of the MBSFN subframes are used for uplink communication or downlink communication.

9. The non-transitory computer readable medium according to claim 8, wherein the receiving an uplink-downlink configuration of a radio frame sent by a base station and the receiving configuration information that is sent by the base station and specifies a part of downlink subframes corresponding to the uplink-downlink configuration of the radio frame as MBSFN subframes, specifically comprise:
receiving uplink-downlink configuration 2 of the radio frame in an LTE/LTE-A TDD system, wherein at least one subframe of subframes 3, 4, 8, and 9 in uplink-downlink configuration 2 is specified as an MBSFN subframe.

10. The non-transitory computer readable medium according to claim 9, wherein:
when the multicast areas of the MBSFN subframes are indicated to be used for uplink communication and unicast areas of the MBSFN subframes are used for downlink communication, multicast areas of subframes 8 and 9 are used to carry PUSCH information and a unicast area of subframe 4 is used to carry a UL grant corresponding to the PUSCH information; or multicast areas of subframes 3 and 4 are used to carry PUSCH information and the unicast area of subframe 9 is used to carry a UL grant corresponding to the PUSCH information.

11. The non-transitory computer readable medium according to claim 8, further comprising:
when the multicast areas of the MBSFN subframes are indicated to be used for uplink communication, a UL grant and/or downlink HARQ-ACK feedback information are received in a downlink subframe that is not specified as an MBSFN subframe, wherein the UL grant is used to schedule an PUSCH for uplink communication in the multicast areas of the MBSFN subframes and the downlink HARQ-ACK feedback information is used to perform HARQ-ACK feedback to the PUSCH for uplink communication in the multicast areas of the MBSFN subframes.

12. The non-transitory computer readable medium according to claim 8, further comprising:
when the multicast areas of the MBSFN subframes are indicated to be used for uplink communication, receiving a UL grant in a class 1 subframe, wherein the UL grant is used to schedule an PUSCH for uplink communication in the multicast areas of the MBSFN subframes and the class 1 subframe belongs to the MBSFN subframes and is a downlink subframe that, according to a 3GPP LTE Release 8 protocol, does not need to send a UL grant.

13. The non-transitory computer readable medium according to claim 8, further comprising:
receiving second information sent by the base station, wherein the second information is used to, when the multicast areas of the MBSFN subframes are indicated to be used for uplink communication, indicate that the unicast areas of the MBSFN subframes are used for uplink communication or downlink communication.

14. The non-transitory computer readable medium according to claim 8, further comprising:
receiving third information from the base station, wherein the third information is used to, when the multicast areas of the MBSFN subframes are indicated to be used for uplink communication, indicate a quantity of SC- FDMA symbols that can be carried in the multicast areas of the MBSFN subframes.

\* \* \* \* \*